(12) United States Patent
Lucco

(10) Patent No.: US 8,404,322 B2
(45) Date of Patent: Mar. 26, 2013

(54) METHOD FOR CREATING ORNAMENTAL STRUCTURES

(76) Inventor: Anthony J. Lucco, Menlo Park, CA (US)

( * ) Notice: Subject to any disclaimer, the term of this patent is extended or adjusted under 35 U.S.C. 154(b) by 20 days.

(21) Appl. No.: 13/426,555

(22) Filed: Mar. 21, 2012

(65) Prior Publication Data

US 2013/0011594 A1    Jan. 10, 2013

Related U.S. Application Data

(63) Continuation-in-part of application No. 13/177,481, filed on Jul. 6, 2011, now Pat. No. 8,147,734.

(51) Int. Cl.
*B29D 22/00* (2006.01)

(52) U.S. Cl. .............. 428/34.1; 428/36.5; 428/411.1; 264/512; 264/500

(58) Field of Classification Search ............... 264/512, 264/500, 46.6; 428/34.1, 36.5, 411.1, 542.2
See application file for complete search history.

(56) References Cited

U.S. PATENT DOCUMENTS 3,168,411 A * 2/1965 Walsh ..................... 427/196
4,041,671 A * 8/1977 Nicholson ............... 52/745.07

* cited by examiner

*Primary Examiner* — Galen Hauth
(74) *Attorney, Agent, or Firm* — Ray K. Shahani, Esq.; Kin H. Lai

(57) ABSTRACT

A method to create a hollow ornamental structure utilizing an inflatable balloon, the ornamental structure features an inner shell layer created by inflating the inflatable balloon to the predetermined size and shape with a filler material, allowing said filler material to harden and pouring out access filler material when a desirable thickness of hardened filler material is attained; and a textured and colored outer shell layer. The basic form of the hollow ornamental structure can be further modified to form a container such as a vase and other decorative pieces.

17 Claims, 5 Drawing Sheets

200'

METHOD FOR CREATING ORNAMENTAL STRUCTURES

RELATED APPLICATIONS

This Application is continuation-in-part of and related to U.S. patent application Ser. No. 13/177,481 filed Apr. 3, 2012, entitled METHOD FOR CREATING ORNAMENTAL STRUCTURES, which is incorporated herein by reference in its entirety, and claims any and all benefits to which it is entitled therefrom.

FIELD OF THE INVENTION

The present invention relates to a spherically shaped ornamental structure, and more particularly to ornamental structures utilizing commercial balloons to create such decorative pieces.

BACKGROUND OF THE INVENTION

It is common to utilize balloons in creating ornamental and art pieces. Two typical examples are balloon modeling or twisting and paper-mache application on balloons.

Paper-mache, is a composite material consisting of paper pieces or pulp, sometimes reinforced with textiles, bound with an adhesive, such as glue, starch, or wallpaper paste. It is a common technique to apply layers of paper-mache on an inflated balloon to create a spherical shell. The balloon is then punctured and paint or other coating materials will be applied on the shell for decoration and protection purposes. Sometimes, the paper-mache shells will be further decorated. Paper-mache is used on carnival masks, art decorations, sculptures and other forms of decoration. One disadvantage of paper-mache is that the end product is usually fragile and decomposable due to the raw materials such as paper, textiles and rubber glue. Also, the art pieces are usually not water proof unless a very heavy coating is applied. Also, using paper-mache to create a shell for art pieces are time consuming as users have to apply multiple layers of thin materials until a certain thickness is attained.

The present invention is a method to create an art decoration piece by filling up a balloon with undecomposable foam material. Coating, molding techniques, decorative pieces and materials will then be applied to create the desirable texture, shape and visual effects of the final art piece.

ADVANTAGES AND SUMMARY OF INVENTION

One object and advantage of the present invention is to provide a undecomposable, water proof art piece in balloon shape.

Another object and advantage of the present invention is to provide an easier and less time consuming method to create a shell in balloon shape.

Another object and advantage of the present invention is to provide liberty and easiness for users to control the thickness of the shell.

Yet another object and advantage of the present invention is its ability to create unique texture of the final art piece.

Further details, objects and advantages of the present invention will become apparent through the following descriptions, and will be included and incorporated herein.

For a better understanding of the invention reference is made to the following detailed description of the preferred embodiments thereof which should be taken in conjunction with the prior described drawings.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 1A:
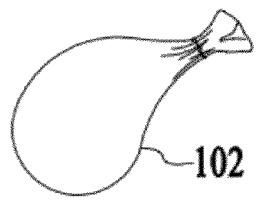
FIG. 1A-1H are representative views of the manufacturing procedures of a method for creating ornamental structures 100 of the present invention.
Figure 1B:
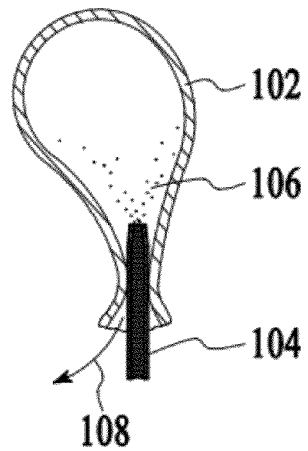
Figure 1C:
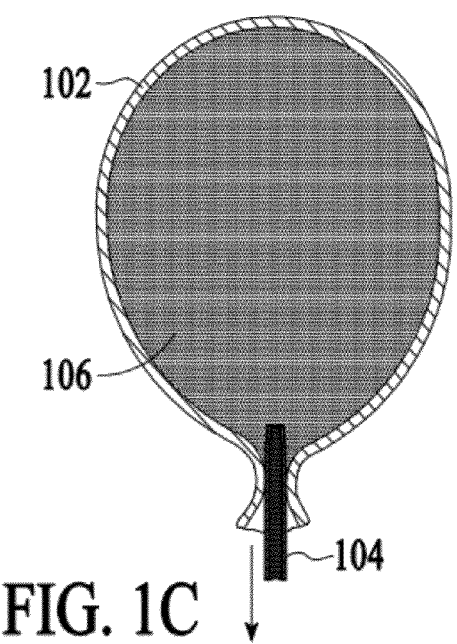
Figure 1D:
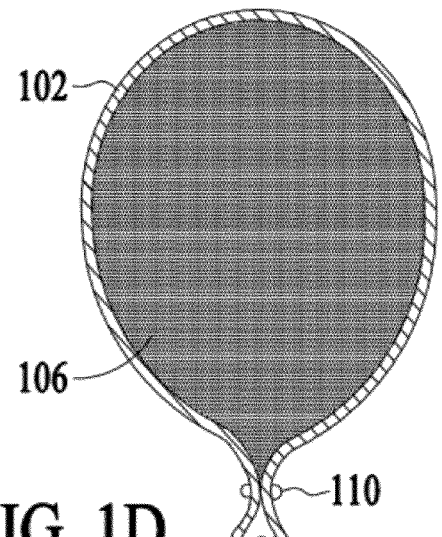

FIG. 1A-1H are representative views of the manufacturing procedures of a method for creating ornamental structures 100 of the present invention. As shown in 1A, the method 100 commences by selecting a balloon 102 of the desirable inflatable size, shape. In one embodiment, balloon 102 is made of materials that are not capable of sustaining the filler material 106 as it is much heavier than air. As shown in FIG. 1B, a nozzle 104 is inserted in balloon 102 and dispose filler material 106 therein; while air 108 inside the balloon 102 is let out. In one embodiment, disposed filler material 106 will expend in volume and fill the entire capacity within the balloon 102 and continue to expand its size. In one embodiment, filler material 106 is commercially available foam based sealing material which will harden during curing. One example of filler material 106 is Hilti® CF 810 Crack and Joint Pro Insulating Filler Foam. As best shown in FIG. 1C, users will dispose filler material 106 inside balloon 102 until desirable size is attained. Users will be mindful that since filler material 106 is expendable, they should stop disposing filler material 106 just shy of the desirable size of the balloon 102 is attained. As shown in FIG. 1D, once desirable size of balloon 102 is attained, users will retract nozzle 104 and seal the balloon 102 with a clamp 110. The curing process begins and users must wait while filler material 106 harden. Optionally, users can mold the shape of balloon 102 slightly with hand or molding tools. Alternatively, users can also use balloon 102 of different shapes to change the shape of finished art structure 180.

Figure 1E:
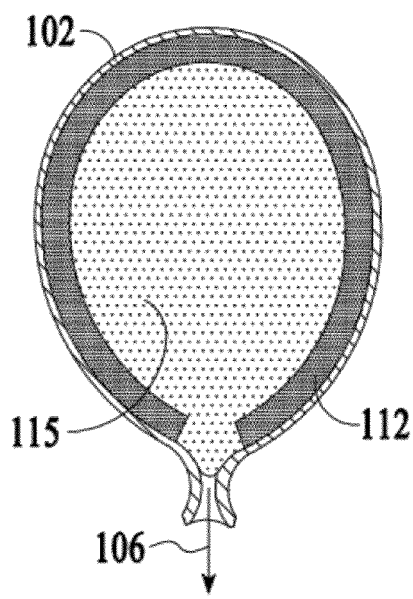

During the curing process, users can periodically check the thickness of hardened shell 112 by poking hole(s) 115 on the balloon 102. As best shown in FIG. 1E, once the desirable thickness of shell 112 is attained, users will dislodge clamp 110 and pour out the still liquefied filler material 106. Alternatively, users can wait until filler material 106 completely solidified and create a solid spherical art piece instead.

Figure 1F:
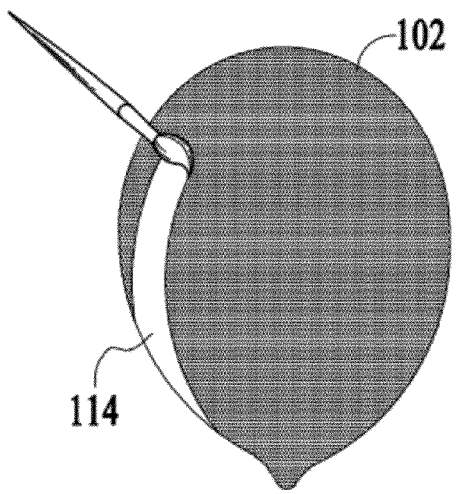
Figure 1G:
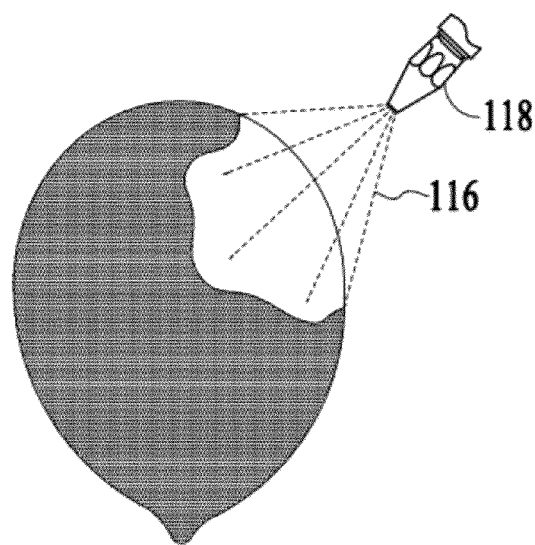
Figure 1H:
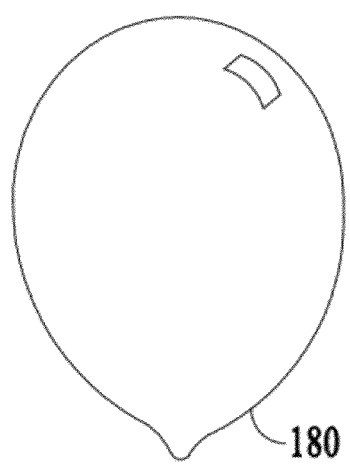

As best shown in FIG. 1F, once shell 112 is completely hardened, users can then apply one or more coat of stucco or plaster 114 directly on the balloon 102. While stucco or plaster 114 is still wet, users can then optionally create surface texture either by hand or tools. After desirable surface texture is created, stucco or plaster 114 will be allowed to air dry until it hardens. Subsequently, as best shown in FIG. 1G, users will decorate stucco or plaster surface 114 with paint 116. Paint 116 can be applied by hand, tools such as a paint brush or spray pen 118. After paint 116 is completely dry, users can optionally apply one or more coats of 2 part resin to make the entire art structure 180 waterproof and scratch proof. Paint 116 preferably is acrylic paint.

In one embodiment, additional decorative treatment can be applied to the stucco or plaster surface 114 addition to paint 116. Various types of materials may be used to add texture and variation to the external surface of the balloons. These additional materials may be placed over or under the painted layer on top of the balloons.

Said various types of materials include but are not limited to the following: Beads or other items made of glass, plastic, ceramic or wood, rhinestones, imitation precious stones and minerals, mirror sections, fibers, woven or quilted fabrics, metallic coatings, glass or ceramic layers, rubber, cork and other natural and synthetic materials, etc.

These various additional materials can be attached to the ornamental balloon structures using adhesives or glue, or mechanical fasteners including nails, staples, rivets, etc. Powdered or liquid materials can also be dusted or sprayed onto the balloon structure surface. Additional to surface treatment, light-weighted structures such as petals, wings, horns, etc. that are made of plastic, wood or other light-weighted materials can be fastened on art structure 180 mechanically or chemically. Those treatments will be suitable when the art structure 180 is decorated as a flower, a bird and an animal.

Figure 2:
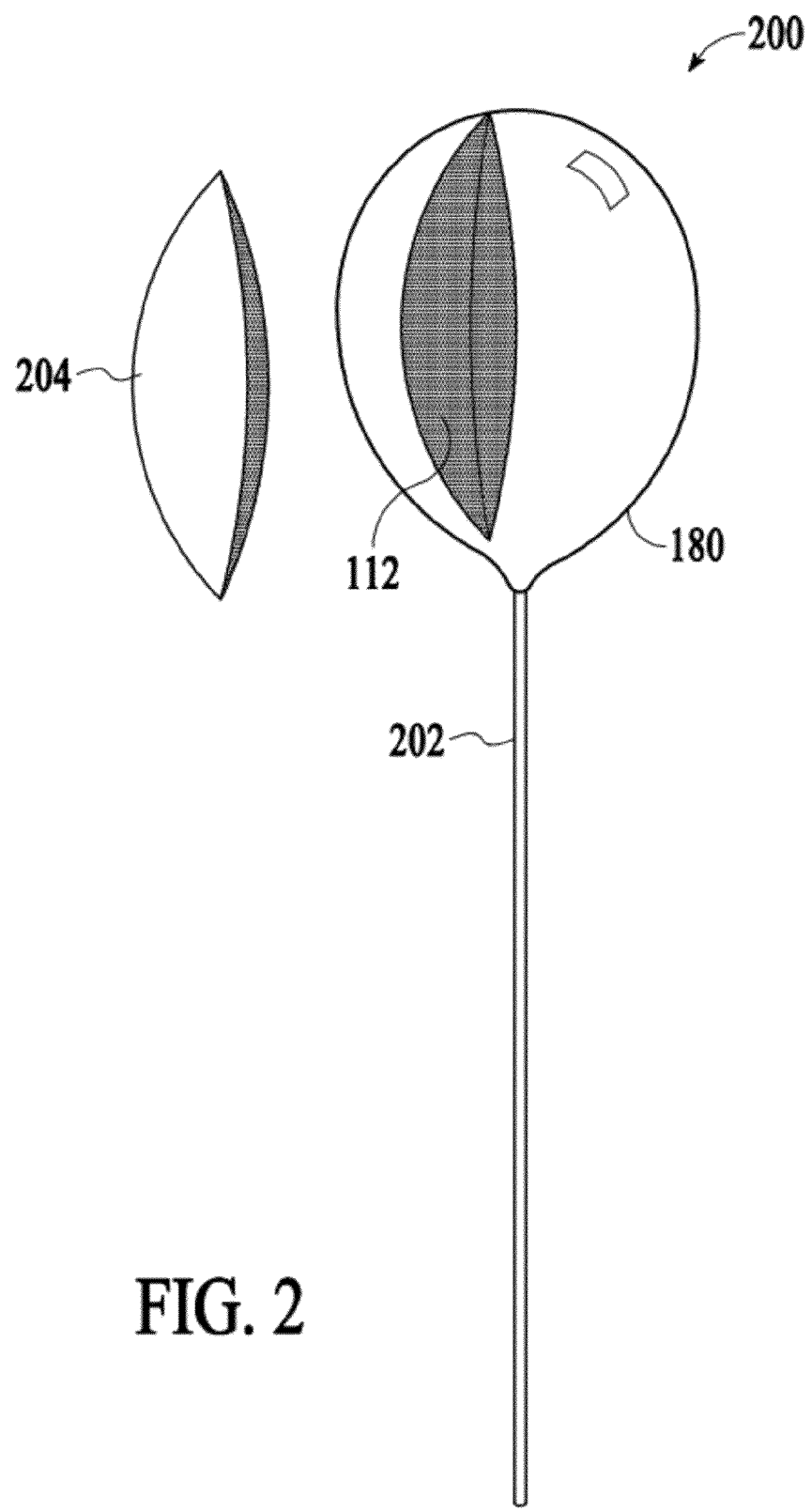
FIG. 2 is a representative isometric view of one alternative treatment of the art ornamental structures 200.

FIG. 2 is a representative isometric view of one alternative treatment of the art ornamental structures 200. As shown in FIG. 2, users can easily convert art structure 180 into a decorative art piece with a hand-held handle 200. As shown in FIG. 2, a stick 202 of any material can be affixed on the art structure 180 as handle, with mechanical or chemical means. To further decorate the decorative art piece with a hand-held handle 200, users can cut into art structure 180 and take out a slice of the shell 204. This decoration technique is especially appropriate when the art structure 180 is decorated as a fruit. Preferably, users should not cut through shell 112 of art structure 180 so as not to expose the hollow cavity 115. Alternatively, users can let filler material 106 completely solidified when creating the art structure 180 for this application.

Figure 2A:
FIG. 2A is a representative isometric view of another alternative treatment of the art ornamental structures 200', showing a tuxedo design.

FIG. 2A is a representative isometric view of another alternative treatment of the art ornamental structures 200', showing a tuxedo design. In one alternative embodiment, instead of a straight slice 204 cut out, cut-outs 204' of other shapes such as a star, various geometric shapes such as a square, a circle, a hexagon, and/or irregular shapes, as long as the shell 112 is not punctured. As previously mentioned, various types of materials may be used to add texture and variation to the external surface of the balloons. These additional materials may be placed over or under the painted layer on top of the balloons. As best shown in FIG. 2A, a tuxedo design is created having a four-prong star-shaped cut-out 204' in combination of using rhinestones to create a bow tie.

Any of various motifs, emblems, designs, logos, characters, or other structures can be formed using these other materials. The ornamental balloons of the present invention can be made to resemble or in the form of faces and/or bodies of people, children or babies, animals, vehicles such as cars, trucks, stars or planets, or any other creative or decorative structure desired.

Figure 3A:
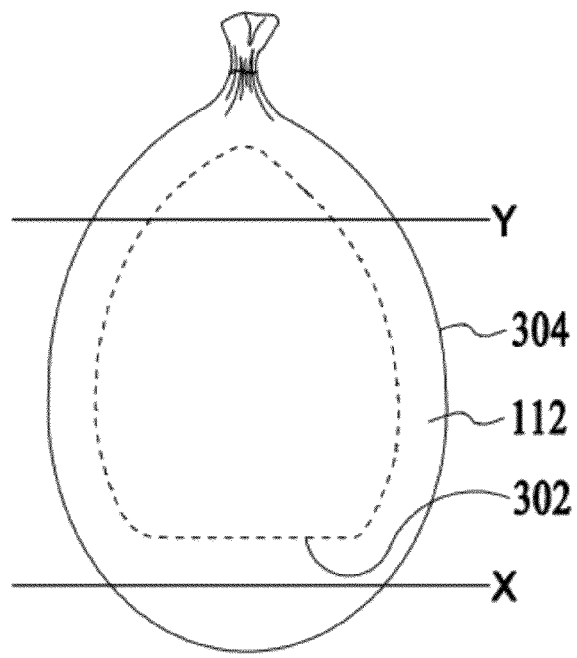
FIG. 3 is a representative isometric view of another alternative treatment of the art ornamental structures 300.
Figure 3B:
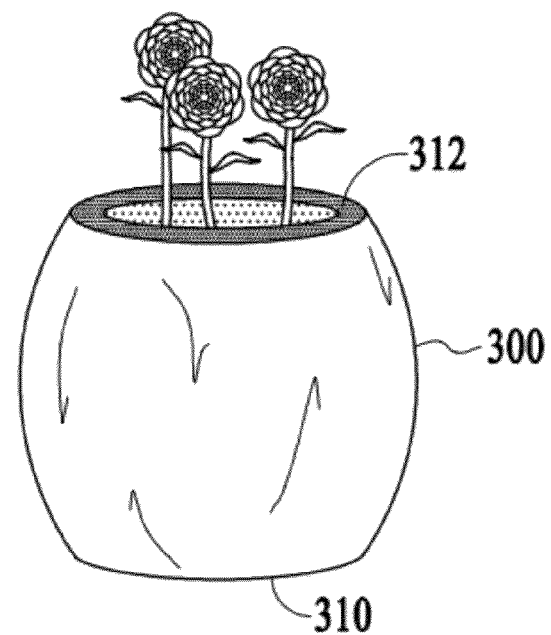

FIG. 3A and 3B are representative isometric views of another alternative treatment of the art ornamental structures 300. As best shown in FIG. 3A, during curing process, after the desirable thickness of shell 112 is attained, users can empty out most of the liquefied filler material 106 and leave a small amount such that it will form a thicker base 302. When shell 112 including base 302 is completely set, users can apply surface treatment as best described in FIG. 1F to 1H to form art structure 304. In order to make art structure 304 into a vase or container, users can cut art structure 304 along cutting plane X and Y. Users can then apply coating and paint on base bottom 310 and opening rim 312 to protect the finished product 300.

For a better understanding of the invention reference is made to the following detailed description of the preferred embodiments thereof which should be taken in conjunction with the prior described drawings.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A hollow ornamental structure formed into a predetermined size and shape utilizing an inflatable balloon, the ornamental structure comprising:
    an inner shell layer created by inflating the inflatable balloon to the predetermined size and shape with a liquefied filler material, allowing said filler material to harden and pouring out excess liquefied filler material when a desirable thickness of hardened filler material is attained; and
    an outer shell layer comprising:
        (i) an outer texture layer created by applying a layer of stucco directly on the outer surface of the balloon, creating surface texture on wet stucco with hands or tools;
        (ii) an outer colored layer created by applying layers of paint on the outer texture layer until desirable color effect is attained;
        (iii) an outer protection layer created by applying layers of resin on the outer colored layer; and
    thin panels made of light-weight materials, the thin panels adhered to the outer protection layer such that the hollow ornamental structure is in the shape of and resembles a flower, bird, or other animal.

2. The hollow ornamental structure of claim 1 further comprises:
    an elongated pole handle portion further having two ends, one end of the elongated pole handle portion fastened mechanically to the outer shell layer.

3. The hollow ornamental structure of claim 1 further comprises:
    (iv) an outer decorative layer created by securing decorative materials on the outer colored layer.

4. The hollow ornamental structure of claim 3 in which the decorative materials are selected from the group of decorative materials consisting of:

beads or other items made of glass, plastic, ceramic or wood, rhinestones, imitation precious stones and minerals, mirror sections, fibers, woven or quilted fabrics, metallic coatings, glass or ceramic layers, rubber, cork and other natural and synthetic materials and combinations thereof.

5. The hollow ornamental structure of claim 1 in which a slice is removed from the outer shell layer to create a customized shape.

6. The hollow ornamental structure of claim 5 in which the slice is in a wedge shape.

7. The hollow ornamental structure of claim 5 in which the slice is in the shape selected from the group of shapes consisting of:
square, rectangular, circular, hexagonal, octagonal, triangular, star, and four pronged star.

8. A hollow vase formed into a predetermined size and shape utilizing an inflatable balloon, the vase comprising:
an inner shell layer created by inflating the inflatable balloon to the predetermined size and shape with a liquefied filler material, allowing said filler material to harden and pouring out excess liquefied filler material when a desirable thickness of hardened filler material is attained; and
an outer shell layer comprising:
(i) an outer texture layer created by applying a layer of stucco directly on the outer surface of the balloon, creating surface texture on wet stucco with hands or tools;
(ii) an outer colored layer created by applying layers of paint on the outer texture layer until desirable color effect is attained; and
(iii) an outer protection layer created by applying layers of resin on the outer colored layer;
an internal horizontal base created by allowing the remaining excess liquefied filler material to harden within the inner shell layer in a stable position;
a vase opening created by cutting horizontally at the top of the balloon; and
a standing base created by cutting horizontally at below the internal horizontal base of the balloon.

9. The hollow vase of claim 8 further comprises:
(iv) an outer decorative layer created by securing decorative materials on the outer colored layer.

10. The hollow vase of claim 9 in which the decorative materials are selected from the group of decorative materials consisting of:
beads or other items made of glass, plastic, ceramic or wood, rhinestones, imitation precious stones and minerals, mirror sections, fibers, woven or quilted fabrics, metallic coatings, glass or ceramic layers, rubber, cork and other natural and synthetic materials and combinations thereof.

11. The hollow vase of claim 8 in which a slice is removed from the outer shell layer to create a customized shape.

12. The hollow ornamental structure of claim 1 in which the thin panels are petal shaped.

13. The hollow ornamental structure of claim 1 in which the thin panels are wing shaped.

14. The hollow ornamental structure of claim 1 in which the thin panels are animal horn shaped.

15. The hollow ornamental structure of claim 5 in which the slice is in the shape of four pronged star.

16. The hollow ornamental structure of claim 15 in which the thin panels are bow tie shaped.

17. A hollow ornamental structure formed into a predetermined size and shape utilizing an inflatable balloon, the ornamental structure comprising:
an inner shell layer created by inflating the inflatable balloon to the predetermined size and shape with a filler liquefied material, allowing said filler material to harden and pouring out excess liquefied filler material when a desirable thickness of hardened filler material is attained;
an outer shell layer comprising:
(i) an outer texture layer created by applying a layer of stucco directly on the outer surface of the balloon, creating surface texture on wet stucco with hands or tools;
(ii) an outer colored layer created by applying layers of paint on the outer texture layer until desirable color effect is attained; and
(iii) an outer protection layer created by applying layers of resin on the outer colored layer; and
structures made of light-weight materials adhered to the outer protection layer such that the hollow ornamental structure is in the shape of and resembles an animal.

* * * * *